United States Patent
Demtröder et al.

(10) Patent No.: US 8,157,690 B2
(45) Date of Patent: Apr. 17, 2012

(54) LUBRICATION SYSTEM FOR A GEARBOX AND WIND TURBINE

(75) Inventors: Jens Demtröder, Rønde (DK); Anders Reinewald Hansen, Skamby (DK)

(73) Assignee: Vestas Wind Systems A/S, Aarhus N (DK)

( * ) Notice: Subject to any disclaimer, the term of this patent is extended or adjusted under 35 U.S.C. 154(b) by 247 days.

(21) Appl. No.: 12/665,760

(22) PCT Filed: Jun. 20, 2008

(86) PCT No.: PCT/DK2008/000232
§ 371 (c)(1),
(2), (4) Date: Dec. 21, 2009

(87) PCT Pub. No.: WO2009/000268
PCT Pub. Date: Dec. 31, 2008

(65) Prior Publication Data
US 2010/0179011 A1 Jul. 15, 2010

(30) Foreign Application Priority Data
Jun. 22, 2007 (DK) ................................ 2007 00910

(51) Int. Cl.
*F16H 57/04* (2010.01)
*F16H 57/08* (2006.01)
(52) U.S. Cl. ........................ 475/159; 475/347
(58) Field of Classification Search .................. 475/159, 475/347
See application file for complete search history.

(56) References Cited

U.S. PATENT DOCUMENTS

| 5,242,033 A | 9/1993 | Toraason |
| 5,484,213 A | 1/1996 | Caillaut et al. |
| 6,994,651 B2 | 2/2006 | Fox et al. |
| 7,771,308 B2* | 8/2010 | Willie ............................ 475/347 |
| 2007/0049448 A1 | 3/2007 | Smet et al. |
| 2008/0194378 A1* | 8/2008 | Fox ................................ 475/347 |

FOREIGN PATENT DOCUMENTS

| DE | 10 2004 023 151 | 12/2005 |
| EP | 1 431 575 | 6/2004 |
| WO | 03/014566 | 2/2003 |
| WO | 03/078870 | 9/2003 |
| WO | 20061053940 | 5/2006 |

OTHER PUBLICATIONS

Denmark Patent and Trademark Office; Search Report issued in Denmark Application No. PS 2007 00910; Jan. 31, 2008; 1 page.
Gearóid O'Shea; International Search Report and Written Opinion issued in related PCT application No. PCT/DK2008/000232; Apr. 27, 2009; 10 pages; European Patent Office.
Gearóid O'Shea; International Preliminary Report on Patentability issued in related PCT application No. PCT/DK2008/000232; Aug. 6, 2009; 8 pages; European Patent Office.

* cited by examiner

*Primary Examiner* — Edwin A Young
(74) *Attorney, Agent, or Firm* — Wood, Herron & Evans, L.L.P.

(57) ABSTRACT

The invention relates to a lubrication system for a gearbox with stationary and rotating gearbox parts particularly in a wind turbine. The system includes lubrication distribution means in the stationary and rotating gearbox parts such as lubrication bores and openings. One or more rotary transmissions establish a transmission channel between lubrication distribution means in said stationary and rotating gearbox parts where said one or more rotary transmission include at least two connecting means. The invention also relates to a wind turbine with a drive train including a gearbox, and a lubrication system.

13 Claims, 9 Drawing Sheets

LUBRICATION SYSTEM FOR A GEARBOX AND WIND TURBINE

FIELD OF THE INVENTION

The invention relates to a lubrication system for a gearbox and a wind turbine.

BACKGROUND OF THE INVENTION

The invention concerns a system for supplying lubrication oil to the planet bearings in a gearbox, particularly a wind turbine gearbox.

There is a category of epicyclic gearboxes where the bearing is supported flexibly relative to the planet carrier, for in general improving load sharing between the planet gears, and load distribution across the width of the individual planet gear.

Examples are described in e.g. patent documents nos. WO 03/014566 (Hansen), U.S. Pat. No. 6,994,651 (Timken) and DE 10 2004 023151 (Jahnel-Kestermann).

Positive feed of oil to the planet bearings is in general a known technology for planetary gearboxes, and has for years been standard in e.g. automotive applications. Particularly for wind turbine gearboxes, a couple of specific solutions have been published e.g. in patent documents nos. WO 03/078870 (Hansen) or EP 1 431 575 (Winergy).

Particularly for such flexibly supported planet bearings, the known lubrication solutions have a shortcoming to bring the oil forward to the bearing. On the one hand, the oil system needs to be flexible enough to follow the motion of the planet shaft, and on the other hand the oil system must under no circumstances prevent the free translational motion of the planet shaft in the bearing.

It is an object of the present invention to provide a lubrication system without the abovementioned problem.

THE INVENTION

The invention relates to a lubrication system for a gearbox with stationary and rotating gearbox parts particularly in a wind turbine, the system comprising lubrication distribution means in the stationary and rotating gearbox parts such as lubrication bores and openings, and one or more rotary transmissions establishing a transmission channel between lubrication distribution means in the stationary and rotating gearbox parts where the one or more rotary transmissions include at least two connecting means.

Hereby is established a lubrication system which allows more flexibility and displacement in a gearbox without interrupting the lubrication flow. Further, a flexible connection from rotary transmission to the individual lubrication points on the rotating gearbox parts is established, allowing translation of the lube point relative to the rotation structure in all directions.

In an aspect of the present invention, the at least two connecting means comprises two annulus and flexible U-profiles and the rotary transmission comprises two sets of lip means. Hereby is established a rotary transmission which tolerates axial offsets between the mounting surfaces, e.g. by the inner lip changing its position versus the outer lip.

In an aspect of the invention, the at least two connecting means comprise sets of lip means. This is advantageous in that lip means is a simple, efficient and inexpensive way of sealing a joint between rotating connecting means and a stationary connecting means.

In an aspect of the present invention, one of the at least two connecting means stretches into the other in order to establish a flexible transmission e.g. the initial sets of lip means in the lubricant flow direction being the inner lip means which are forced against the latter and outer set of lips.

Making the lip means overlap by stretching into each other is advantageous, in that pressure from the flowing lubricant will force the lip means together in the overlap zone, thereby further sealing the rotary transmission.

In an aspect of the present invention, one or both lip means comprises a tapering shape toward the contact area of the lip means. Hereby it is possible to establish a response of the rotary transmission in a given situation e.g. designing a self-protecting against excessive lubrication pressure in the rotary transmission by bending the outer lips outward at or above a defined value.

In an aspect of the present invention, at least one of the lip means are made from an elastic material such as plastic or rubber e.g. PTFE coated, a soft material such as brass or bronze, a compound such as rubber lips on a sheet metal carrier e.g. vulcanised. By the choice in materials, the lip means are advantageously less prone to wear. The carrier material may hold certain spring properties e.g. with the same effect as the tapered shape.

In an aspect of the present invention, the lubrication system includes a lubrication flow path comprising a bore in an annulus gear, a bore in the housing and/or a bore in a component attached to the housing as a stationary gearbox part and a bore in a planet carrier as a rotating gearbox part, a rotary transmission, a flexible external connection or an internal channel to distribution bores in or in proximity of a planet shaft. Hereby, the rotary transmission is located closest to the bearing which connects the rotating and the stationary system, meaning that the relative displacement between the parts is less than elsewhere, which makes the transmission easier, more reliable, and less prone to wear.

It should be noted that in this context, the term shaft is to be considered equivalent with any kind of axle, pin or other devices suited for serving as a more or less fixed mounting for a rotating part.

In an aspect of the present invention, the lubrication system includes at least two lubrication flow paths comprising at least one bore in an annulus gear, at least one bore in the housing and/or at least one bore in a component attached to the housing as a stationary gearbox part and at least one bore in a planet carrier as a rotating gearbox part, at least two rotary transmissions, at least one flexible external connection or at least one internal channel to distribution bores in or in proximity of a planet shaft.

Independent and redundant distribution systems for lubrication may hereby be established. Further, the lubrication system may have two channels for heavy load situations or emergency situations such as a blockage in one channel.

In an aspect of the present invention, a rotation connection comprising a pipe and a bushing between a flexible external connection and a planet shaft is established, hence allowing the planet shaft rotational freedom without influencing the lubrication path.

In an aspect of the present invention, the flexible external connection is a hose allowing for translational movements in the gearbox.

A hose is a simple and inexpensive way of establishing a flexible fluid connection between parts moving slightly in relation to each other in a wind turbine gearbox.

In an aspect of the present invention, the one or more rotary transmissions is positioned in an axial direction, in a radial direction or in both an axial direction and in a radial direction.

Placing the rotary transmissions in an axial direction, a radial direction or both is advantageous in that hereby the parts can be made less complex and in that this enables a more simple assembly procedure, thereby reducing the cost.

In an aspect of the present invention, the one or more rotary transmissions are positioned in an area between stationary and rotating gearbox parts in order to establish a transmission channel between lubrication distribution means in the stationary and rotating gearbox parts by the at least two connecting means extending out from the stationary and rotating gearbox parts.

Placing the rotary transmission in the area between a stationary and a rotating gearbox part is advantageous because it is thereby avoided to integrate the transmission in one or both of the parts and thereby costs are reduced.

The invention also relates to a wind turbine comprising a drive train including a gearbox, and a lubrication system as described above for the gearbox.

Wind turbine gearboxes are different from most other types of gearboxes by the fact that they have to be able to cope with much more flexure and deflection of both the nacelle structure in which the gearbox is mounted and in the gearbox strengthening structure itself. This is due to the massive size of modern wind turbines combined with the demand of low weight, low cost and high output. It is therefore particularly advantageous to use a lubrication system according to the present invention for transferring lubricant between mutually rotating parts of a wind turbine gearbox.

In an aspect of the present invention, the gearbox is an epicyclic gearbox such as a planetary, star or solar gearbox or any kind of compound gearbox and/or gearboxes with one or more bearing rows.

Epicyclic gearboxes are relatively low weight, low cost and small in relation to the load they are able to transfer but due to the generic design of the epicyclic gearboxes this gearbox type is more prone to flexure and deflections and it is therefore advantageous to use a lubrication system according to the present in a epicyclic gearbox.

FIGURES

The invention will be described in the following with reference to the figures in which.

DETAILED DESCRIPTION

Figure 1:
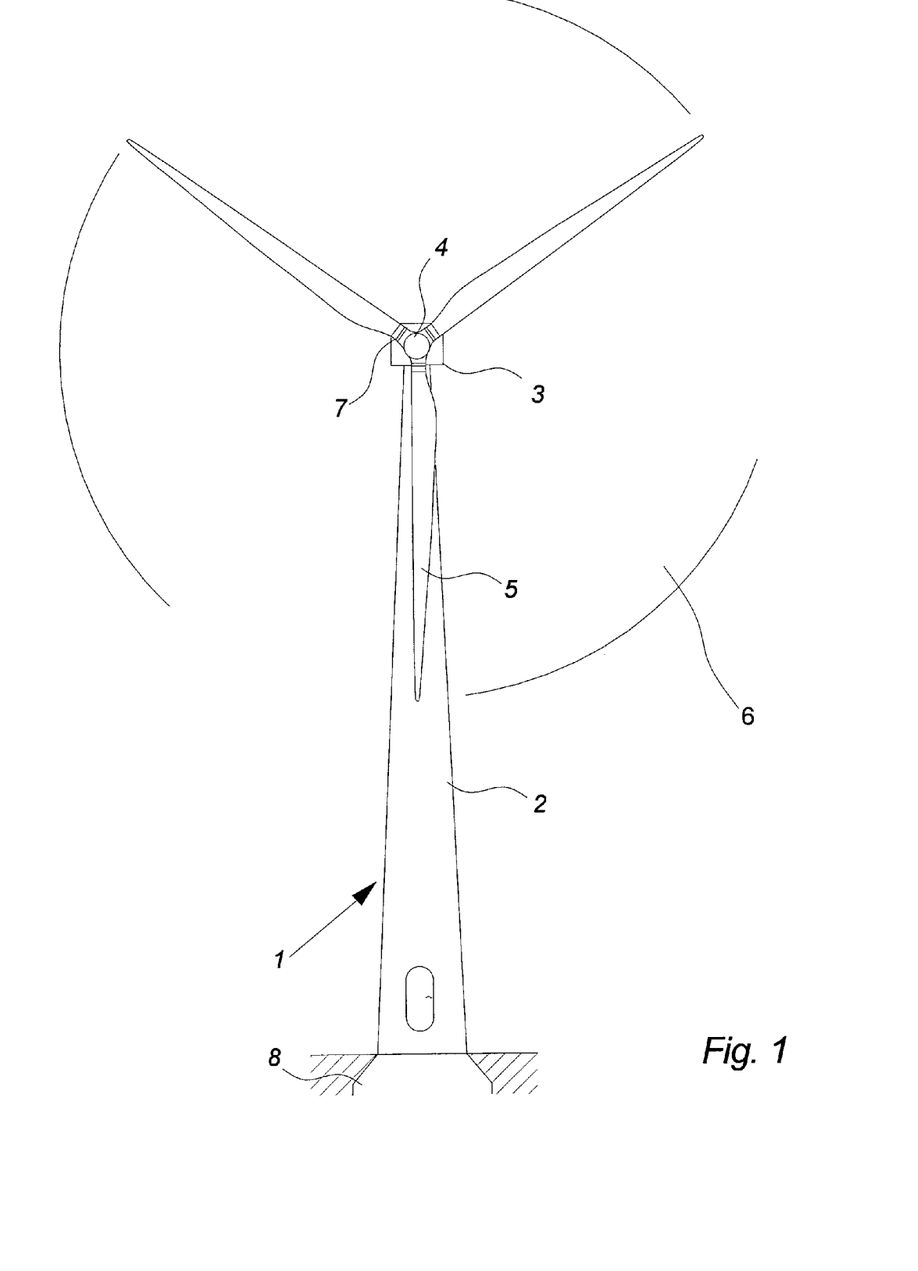
FIG. 1 illustrates a large modern wind turbine.

FIG. 1 illustrates a modern wind turbine 1 mounted on a foundation 8. The wind turbine comprises a tower 2, including a number of tower sections such as tower rings, and a wind turbine nacelle 3 positioned on top of the tower 2. The wind turbine rotor 6, comprising three wind turbine blades 5, is connected to the hub 4 through pitch mechanisms 7. Each pitch mechanism 7 includes a blade bearing which allows the blade 5 to pitch in relation to the wind. The hub 4 is connected to the nacelle 3 through a shaft which extends out of the nacelle front. The shaft is connected through a gearbox mechanism to an electric generator wherein the connection may comprise one or more shaft bearings such as rotor and generator bearings.

Figure 2:
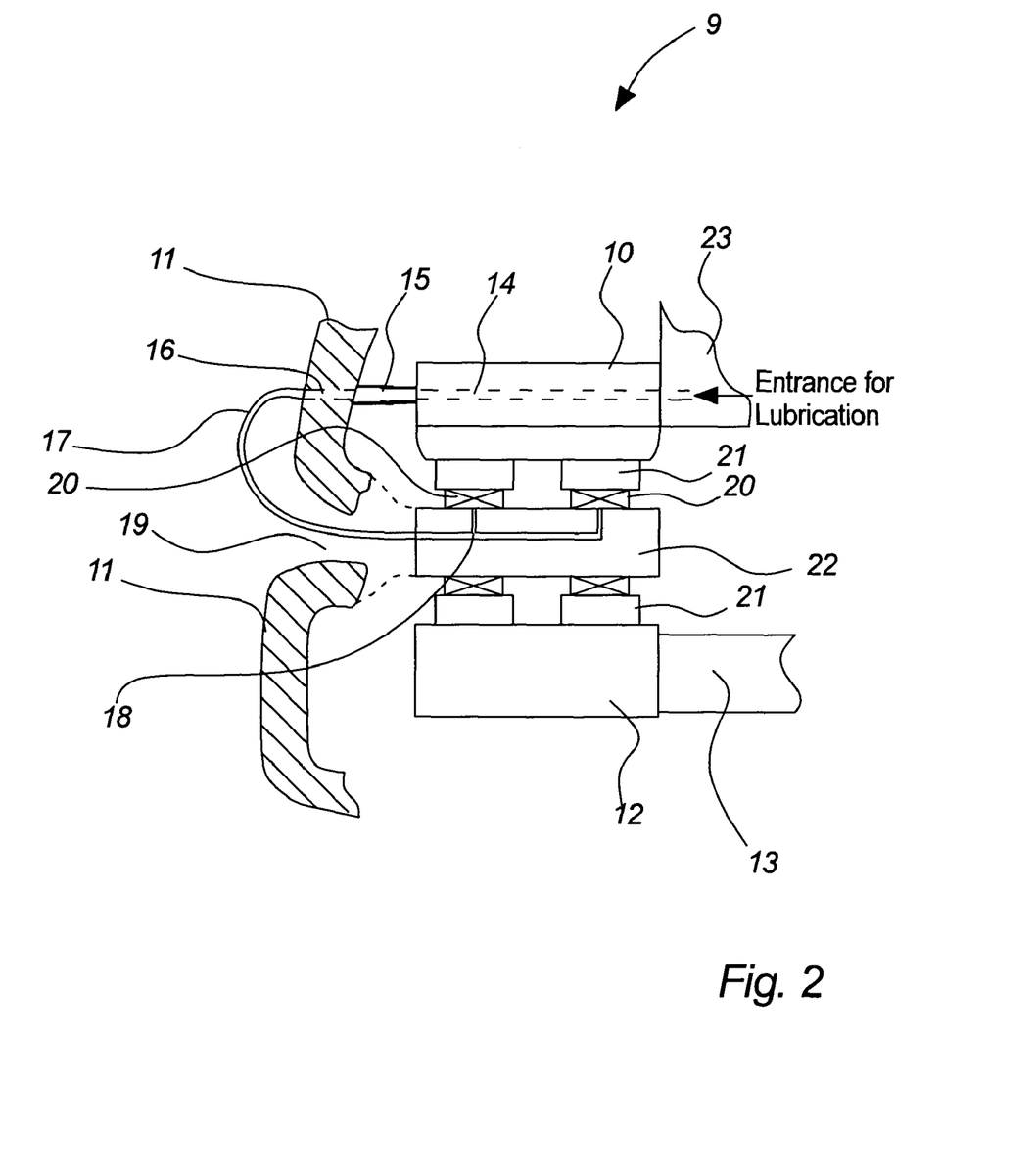
FIG. 2 illustrates a first embodiment of a gearbox and lubrication system according to the invention.
Figure 3:
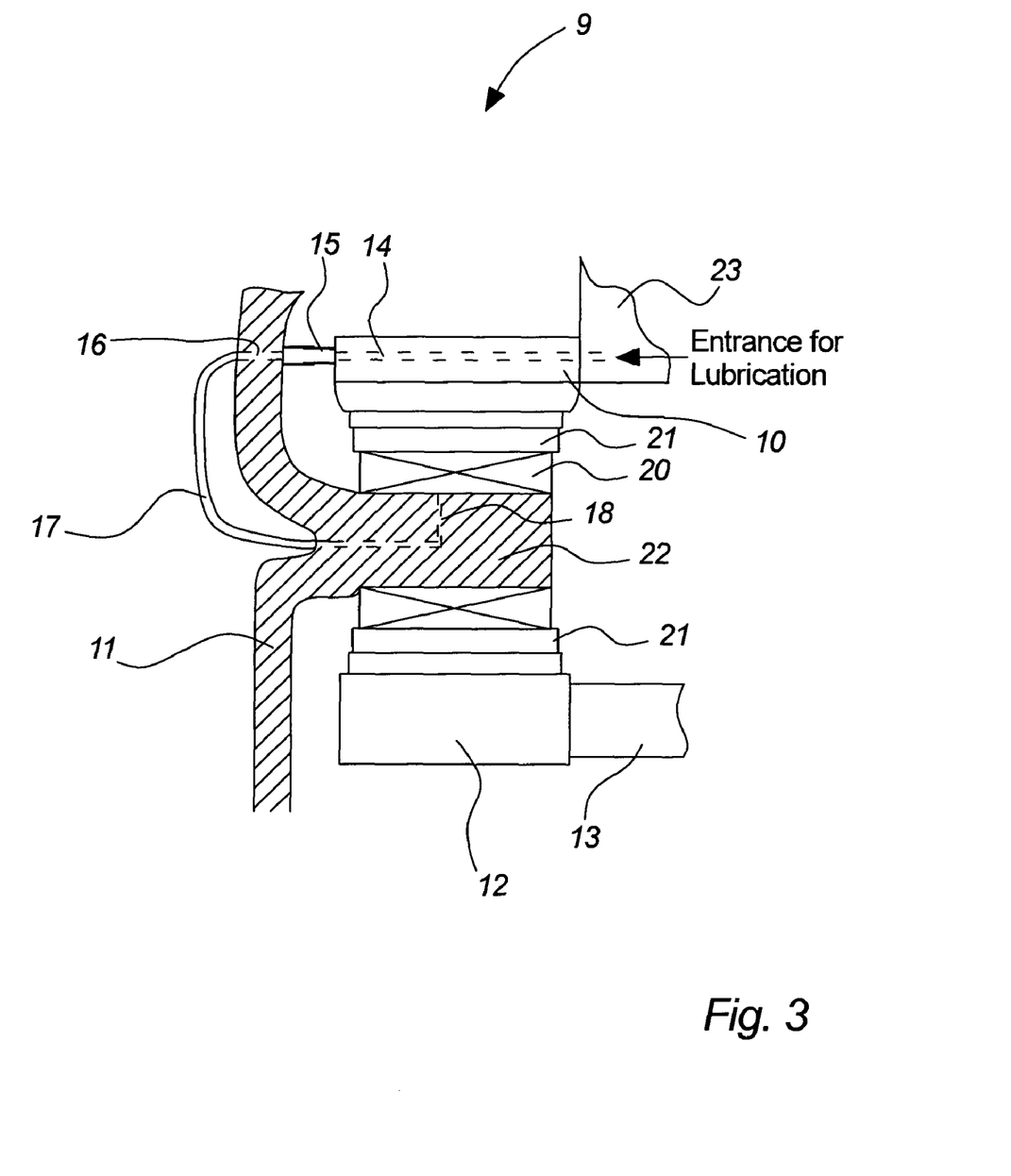
FIG. 3 illustrates a further embodiment of a gearbox and lubrication system according to the invention.

FIGS. 2 and 3 illustrate a first and further embodiment of gearbox 9 and a lubrication system according to the invention. The gearbox 9 is preferably a planetary gearbox in a wind turbine 1.

The lubrication oil is supplied to the planet bearing 20 through the planet shaft 22.

This requires (a) to transfer oil from a stationary frame 23 to the rotating system 11, and (b) to conduct oil further on to the flexibly supported planet shafts 22.

(a) For transferring oil from the stationary to the rotating system, a bore 14 is arranged in an axial direction through the annulus gear 10. This bore is supplied with oil from the stationary housing 23. A rotating transmission 15 feeds the oil from this bore 14 through the stationary annulus gear 10 towards the rotating planet carrier 11. This position comes closest to the bearing 28 which connect the rotating and the stationary system, meaning that the relative displacement between the parts is less than elsewhere, which makes the transmission easier, more reliable, and less prone to wear.

It shall be emphasised that the transfer of lubrication oil may also be from a part of the housing 23 or any component mounted in a stationary manner to the housing 23 to the rotating system i.e. without using a path through the annulus gear 10.

(b) Once transferred in the rotating system, the oil can either be conducted through channels (an embodiment illustrated in FIG. 5) in the rotating planet carrier 11 to the planet shafts 22, or by a flexible external connection 17 from the planet carrier 11 to the planet shaft 22. This flexible connection 17 may for example be a simple hose 17, which would be able to follow the planet shaft 22 without constraining displacements.

Figures 4A, 4B:
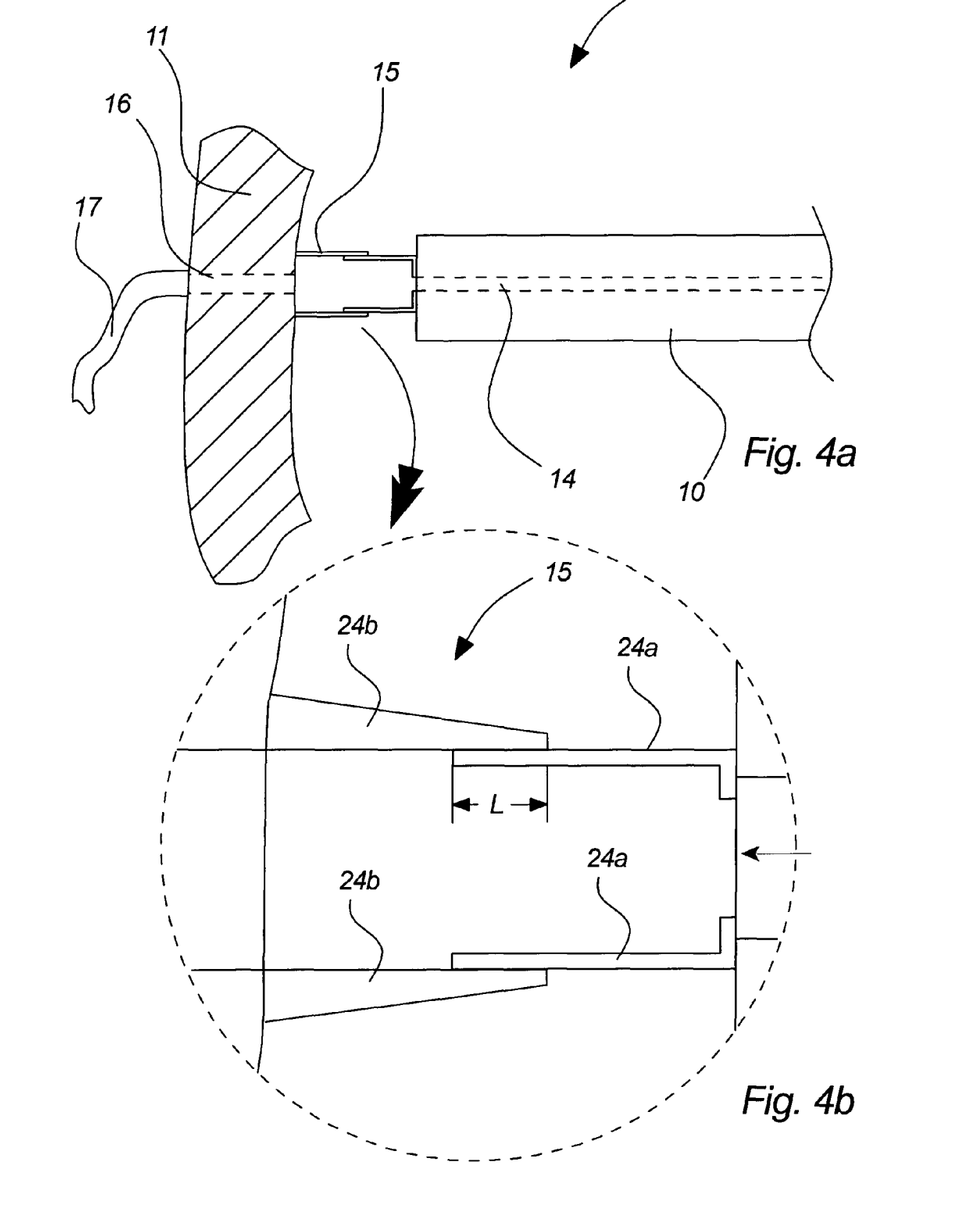
FIGS. 4a to 4d illustrate embodiments of a rotary transmission in the lubrication system according to the invention.

Wobbling is a local axial and/or radial uneven movement in the gearbox system and the flexibility of the lubrication system according to the invention is especially relevant in relation to:

1. Rotation of one gearbox part e.g. the planet carrier 11
2. Translation e.g. the flexible planet shaft 22
3. Rotation of the planet shaft 22 vs. the planet carrier 11
4. Axial movement
5. Radial movement FIGS. 4a and 4b illustrate a preferred embodiment of a rotary transmission 15 in the lubrication system according to the invention.

The rotary transmission 15 may be arranged by two flexible U-profiles 24a, 24b engaging with each other and especially over an overlap distance L. The oil pressure injected through the bore 14 will cause the lips of the inner profile 24a to inflate, until they contact the outer profile 24b. At the same time, the flexibility of the outer profile 24b will allow the two lips to follow each other in case of radial offsets between their mounting surfaces. The system can also tolerate axial offsets between the mounting surfaces, just by the inner lip 24a changing its position versus the outer lip 24b (i.e. a change in the distance L).

Wear in the contact between the lips 24a and 24b can be controlled by proper choice of materials (or surface treatment e.g. by coating with PTFE or alike), and is further reduced by the fact that this contact is always submerged in oil.

Depending on the surface area of the outer lip 24b which is exposed to the oil pressure, and the elasticity of this lip, the system may be designed to be self-protecting against excessive pressure. Too high pressure may cause the outer lip 24b to bend outwards, until some oil can escape, and the pressure is released until equilibrium is achieved. This functionality may be used to control the flow to the bearing 20 as a function of oil viscosity, which again is a function of oil temperature.

There is no preference whether the inner lip 24a is mounted on the stationary or the rotary part, the system can work both ways.

FIG. 4b illustrates inner and outer lip means 24a, 24b of the rotary transmission 15 in an enlarged view. The outer lips are shown with a tapering shape toward the contact area of the lips and the inner lips with a uniform shape, but any type of relevant shape may be used for the lips.

Figure 4C:
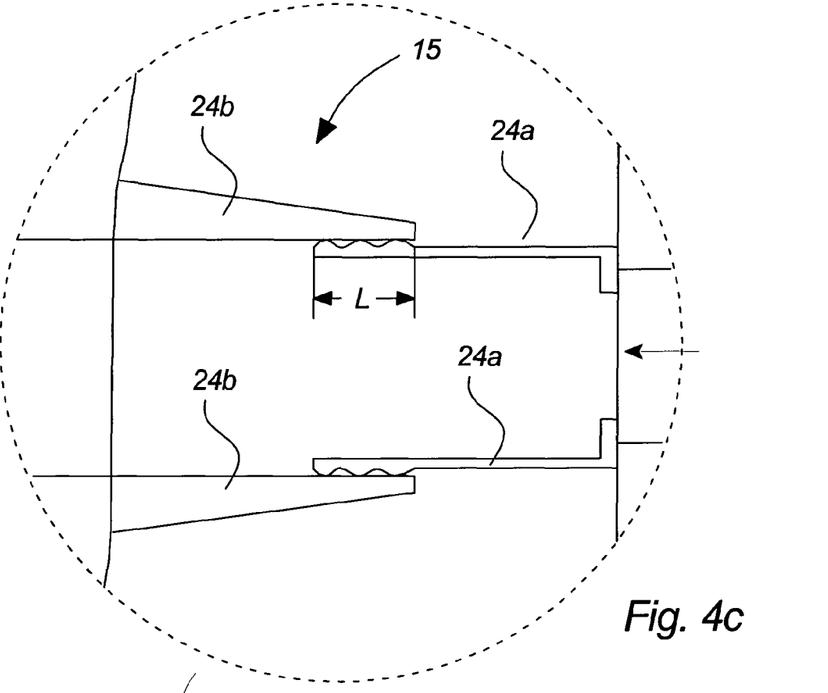

FIG. 4c illustrates an embodiment of the inner and outer lips 24a, 24b of the rotary transmission 15 in a further enlarged view and with a different profiling of the lips by introducing a number of outward elevations in the inner lips 24a and/or a number of inward elevations in the outer lips 24b.

Figure 4D:
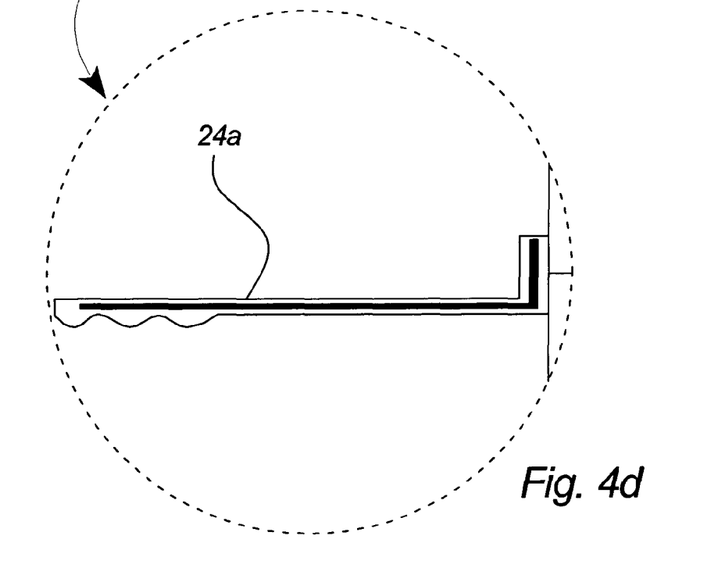

FIG. 4d illustrates a further embodiment of inner lips 24a with a compound solution. As illustrated, a sheet metal carrier in the lips is applied with a rubber coating e.g. in a vulcanising process in order to establish a flexible lip means. It shall be emphasised that the solution may be used in the inner as well as the outer lips 24a, 24b.

Figure 5:
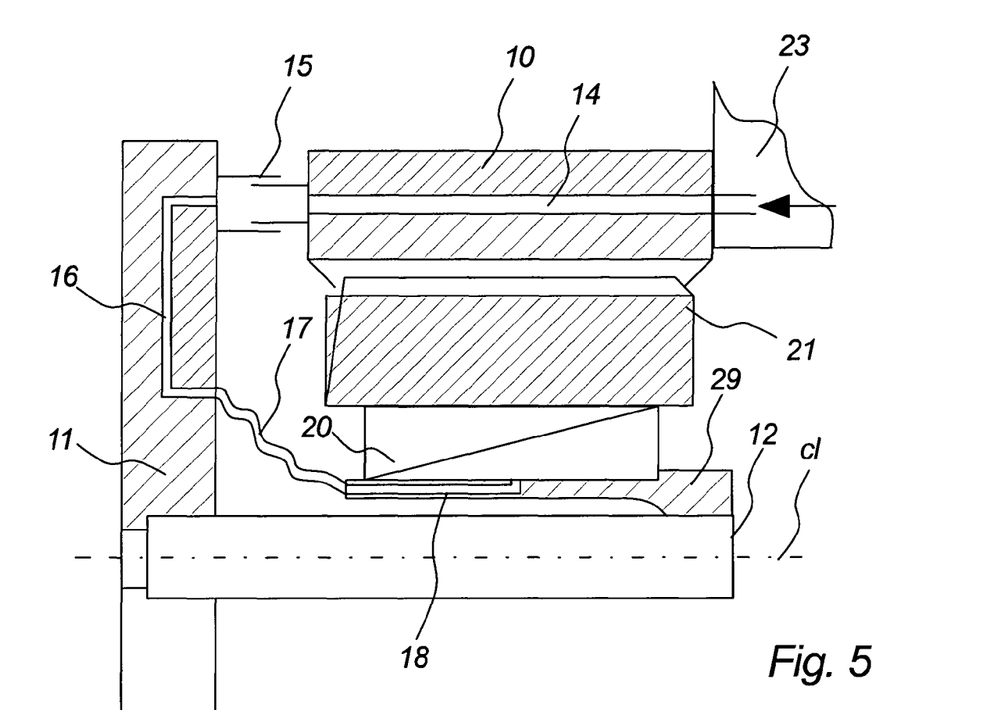
FIG. 5 illustrates an embodiment of the lubrication system according to the invention with a lubrication bore in the planet carrier.

FIG. 5 illustrates an embodiment of the lubrication system according to the invention wherein the bore 16 in the planet carrier is continued to a position in proximity of the planet bearing 20. A hose 17 connects the bore 16 with a bore 18 in a bearing support or raceway 29. The hose 17 may be replaced by different bores in the planets 21 or moved to the other side of the planets 21 by bores through the planets 21.

Figure 6:
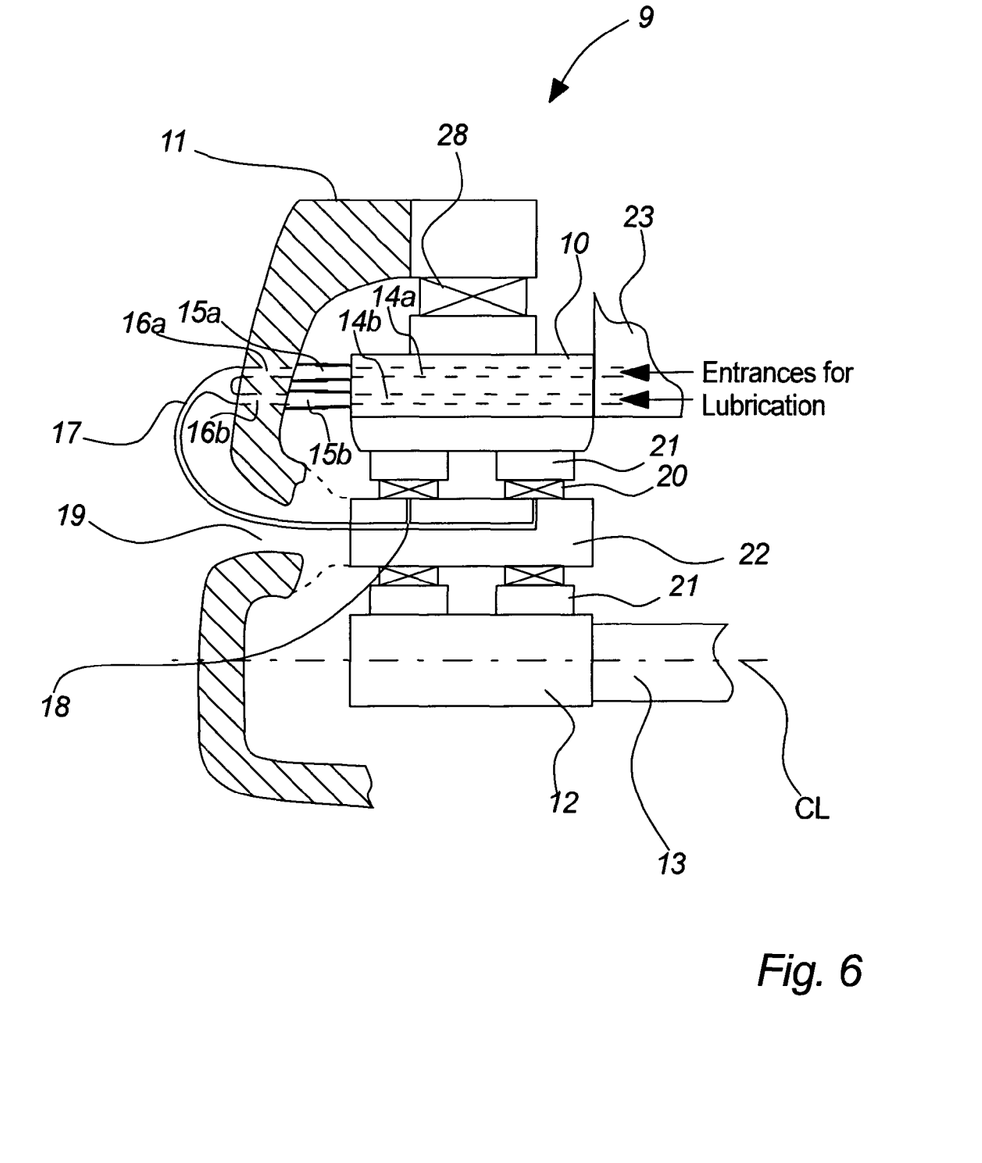
FIG. 6 illustrates an embodiment of the lubrication system according to the invention with two rotary transmissions.

FIG. 6 illustrates an embodiment of the lubrication system according to the invention with two rotary transmissions 15a, 15b. Each of the two rotary transmissions 15a, 15b is connected to separate bores 14a, 16a; 14b, 16b in the stationary annulus gear 10 and/or planet carrier 11, respectively. The two bores 16a, 16b in the planet carrier 11 are connected to a common hose 17.

A lubrication system including two rotary transmissions 15a, 15b (or more) may be used as independent and redundant distribution systems for lubrication e.g. if a lubrication component fails in one system the other system may continue the lubrication.

Further, the lubrication system may have two channels including two rotary transmissions 15a, 15b (or more) but no further redundancy e.g. one channel for normal lubrication situations and one more for heavy load situations or emergency situations such as a blockage in the normal situation channel.

The figure illustrates the lubrication system as positioned inside a main bearing 28 in relation to the centre line CL of the gearbox 9. However, it shall be emphasised that the lubrication system may also be positioned on the outside of the main bearing 28.

Figure 7:
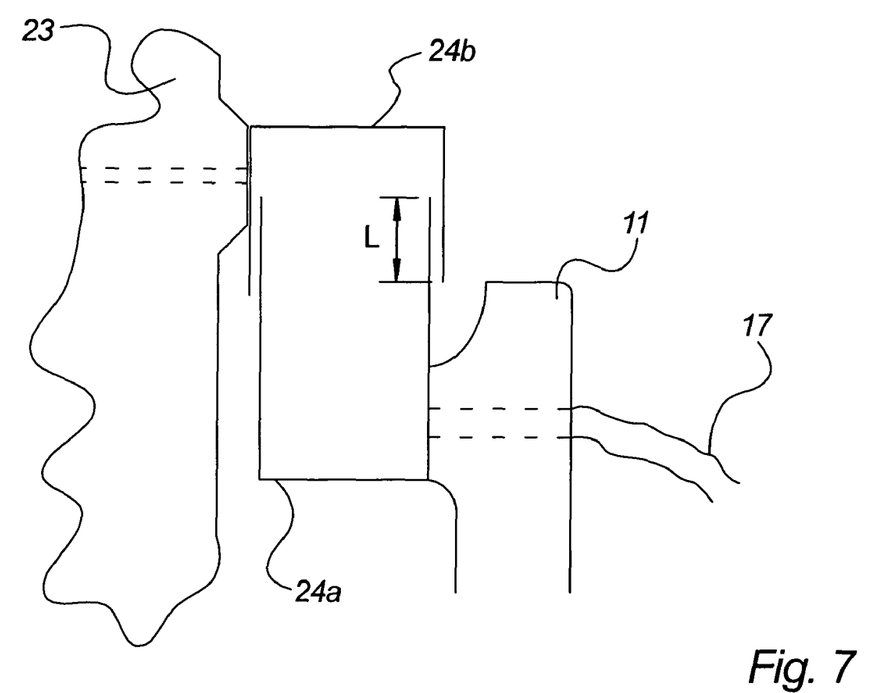
FIG. 7 illustrates an embodiment of a vertical or radial rotary transmission in the lubrication system according to the invention.

FIG. 7 illustrates an embodiment of a vertically or radially aligned rotary transmission 15 in the lubrication system with the lip means 24a, 24b facing up and down, respectively in order to establish an overlap distance L.

Figure 8:
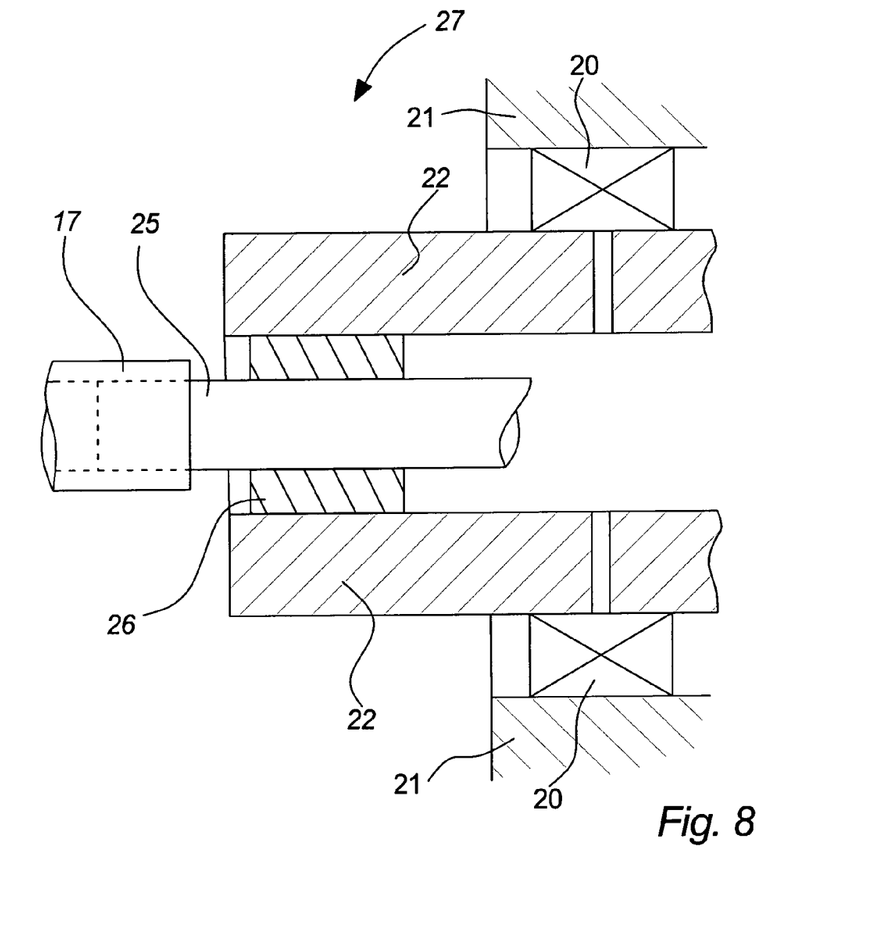
FIG. 8 illustrates an example of a rotation connection between a flexible external connection and a planet shaft.

FIG. 8 illustrates an example of a rotation connection 27 between a flexible external connection 17 and a planet shaft 22.

For a gearbox design where the planet shaft 22 has the freedom to constantly or occasionally rotate relative to the planet carrier 11, for example in compound epicyclic arrangements, a rotation connection 27 from the flexible hose 17 to the planet shaft 22 may be required.

One simple execution of this transmission could be a bushing 26 from a soft material with low friction (such as PTFE or bronze) fitted into the planet shaft 22. The hose 17 could then be connected to one end of a pipe 25 which is non-rotatably but else free linked to the planet carrier 11, whilst the other end of the pipe 25 protrudes into the planet shaft 22 through the bushing 26. It is not required that the seat between bushing 26 and pipe 25 is oil tight. The gap must only be tight enough to create a flow resistance that is larger than the passage through the planet bearing 20.

The illustrated outer bearing 20 should be understood as a symbolic indication of the planets 21 further rotation inside the gearbox.

The solution is particularly relevant for bearings 20 with more bearing rows, where the oil is distributed through channels in the inner ring, or between the bearings.

The invention described has been exemplified above with reference to specific examples of epicyclic gearboxes 9 e.g. planetary gearboxes with a stationary annulus gear 10. However, it should be understood that the invention is not limited to the particular examples but may be designed and altered in a multitude of varieties within the scope of the invention as specified in the claims e.g. epicyclic gearboxes 9 with stationary sun 12 or planet gear 21 (solar or star gearboxes).

Further, the epicyclic gear 9 may comprise more than one stage wherein different connection parts between the stages may comprise bores 14, 16, 18 or flexible connections 17 such as hoses in order to establish the necessary distribution channels in the lubrication system.

| Reference list In the drawings the following reference numbers refer to: | |
|---|---|
| 1. | Wind turbine |
| 2. | Wind turbine tower |
| 3. | Wind turbine nacelle |
| 4. | Wind turbine hub |
| 5. | Wind turbine blade |
| 6. | Wind turbine rotor with at least one blade |
| 7. | Blade pitch mechanism |
| 8. | Wind turbine foundation |
| 9. | Gearbox such as planetary gearbox |
| 10. | Annulus gear or ring gear |
| 11. | Planet carrier |
| 12. | Sun gear |
| 13. | Output shaft or high speed shaft |
| 14. | Bore in the annulus gear |
| 15. | Rotary transmission |
| 16. | Bore in the planet carrier |
| 17. | Flexible external connection e.g. a hose |
| 18. | Bore in the planet shaft |
| 19. | Opening in the planet carrier for e.g. a hose |
| 20. | Planet bearings |
| 21. | Planet gear |
| 22. | Planet shaft |
| 23. | Stationary housing of the gearbox |
| 24a, 24b. | Sets of lips in the rotary transmission |
| 25. | Pipe |
| 26. | Bushing |
| 27. | Rotation connection between flexible external connection and planet shaft |
| 28. | Bearing e.g. a main bearing |
| 29. | Bearing support or raceway |
| L. | Overlap distance |
| CL. | Centre line of gearbox |

The invention claimed is:

1. A wind turbine, comprising:
   a drive train including a gearbox with stationary and rotating gearbox parts, said gearbox including a lubrication system comprising:
      lubrication distributors in said stationary and rotating gearbox parts, and
      one or more rotary transmissions establishing a transmission channel between said lubrication distributors in said stationary and rotating gearbox parts,
   wherein said one or more rotary transmissions include at least two connectors, at least one of said at least two connectors being connected to said stationary gearbox part and at least one other of said at least two connectors being connected to said rotating gearbox part, and
   wherein said at least two connectors comprise sets of flexible lip arrangements, one of said sets of lip arrangements stretching into the other of said sets of lip arrangements in order to establish a flexible transmission connection.

2. The wind turbine according to claim 1 where said at least two connectors include annular and flexible U-profiles.

3. The wind turbine according to claim 1 where said sets of lip arrangements include an inner set of lips and an outer set of lips, said inner set of lips being forced against said outer set of lips.

4. The wind turbine according to claim 1 where one or both lip arrangements comprises a tapering shape toward a contact area of the lip arrangements.

5. The wind turbine according to claim 1 where at least one of the lip arrangements include an elastic material.

6. The wind turbine according to claim 1 where the lubrication system includes a lubrication flow path comprising a bore in an annulus gear, a bore in a housing and/or a bore in a component attached to the housing as a stationary gearbox part and a bore in a planet carrier as a rotating gearbox part, a rotary transmission, a flexible external connection or an internal channel to distribution bores in or in proximity of a planet shaft.

7. The wind turbine according to claim 1 where the lubrication system includes at least two lubrication flow paths comprising at least one bore in an annulus gear, at least one bore in a housing and/or at least one bore in a component attached to the housing as a stationary gearbox part and at least one bore in a planet carrier as a rotating gearbox part, at least two rotary transmissions, at least one flexible external connection or at least one internal channel to distribution bores in or in proximity of a planet shaft.

8. The wind turbine according to claim 1 where a rotation connection comprising a pipe and a bushing between a flexible external connection and a planet shaft is established.

9. The wind turbine according to claim 8 where said flexible external connection is a hose allowing for translational movements in the gearbox.

10. The wind turbine according to claim 1 where said one or more rotary transmissions is positioned in an axial direction, in a radial direction or in both an axial direction and in a radial direction.

11. The wind turbine according to claim 1 where said one or more rotary transmissions are positioned in an area between stationary and rotating gearbox parts in order to establish a transmission channel between lubrication distributors in said stationary and rotating gearbox parts by said at least two connectors extending out from said stationary and rotating gearbox parts.

12. The wind turbine according to claim 1 where said gearbox is an epicyclic gearbox.

13. The wind turbine according to claim 12 where said epicyclic gearbox is selected from the group consisting of a planetary gearbox, a star gearbox, a solar gearbox, a compound gearbox, a single staged gearbox, and a multi-staged gearbox.

* * * * *

UNITED STATES PATENT AND TRADEMARK OFFICE
CERTIFICATE OF CORRECTION

| | | |
|---|---|---|
| PATENT NO. | : 8,157,690 B2 | Page 1 of 1 |
| APPLICATION NO. | : 12/665760 | |
| DATED | : April 17, 2012 | |
| INVENTOR(S) | : Jens Demtröder et al. | |

It is certified that error appears in the above-identified patent and that said Letters Patent is hereby corrected as shown below:

Column 2, Cover Page, Item 57, Line 8

Change "include" to --includes--.

Column 1

Line 58, change "comprises" to --comprise--.

Column 2

Line 14, change "self-protecting" to --self-protection--.

Line 18, change "are" to --is--.

Column 3

Line 6, change "are" to --is--.

Column 4

Line 26, change "connect" to --connects--.

Column 6

Line 9, change "rotatably" to --rotatable--.

Column 7

Claim 5, Line 32, change "include" to --includes--.

Column 8

Claim 11, Line 24, change "are" to --is--.

Signed and Sealed this
Thirty-first Day of July, 2012

David J. Kappos
*Director of the United States Patent and Trademark Office*